(No Model.) 2 Sheets—Sheet 1.

A. A. UGLAND.
MOTOR FOR VELOCIPEDES.

No. 319,040. Patented June 2, 1885.

WITNESSES:
Morris H. Clark
J. S. Brown

INVENTOR
Andrew A. Ugland,
By J. B. Sawyer
ATTY (No Model.) 2 Sheets—Sheet 2.

A. A. UGLAND.
MOTOR FOR VELOCIPEDES.

No. 319,040. Patented June 2, 1885.

WITNESSES:
Norris A. Clark
J. S. Brown

INVENTOR:
Andrew A. Ugland,
By J. B. Lawyer,
Atty.

UNITED STATES PATENT OFFICE.

ANDREW A. UGLAND, OF SMITHVILLE, NEW JERSEY.

MOTOR FOR VELOCIPEDES.

SPECIFICATION forming part of Letters Patent No. 319,040, dated June 2, 1885.

Application filed December 1, 1884. (No model.)

*To all whom it may concern:*

Be it known that I, ANDREW A. UGLAND, a subject of the Kingdom of Norway, residing at Smithville, in the county of Burlington and State of New Jersey, have invented certain new and useful Improvements in Motors for Bicycles and other Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1:
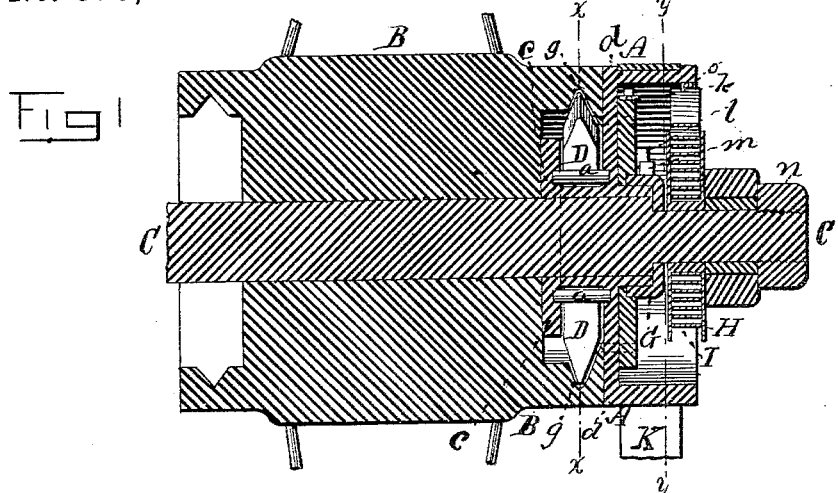
Figure 3:
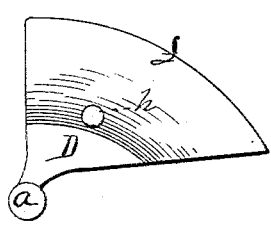
Figure 2:
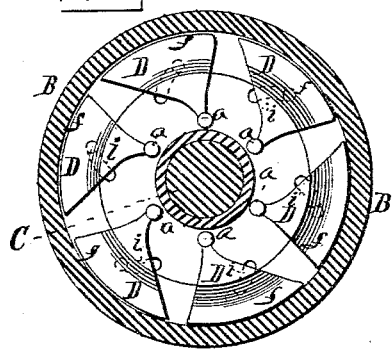
Figure 4:
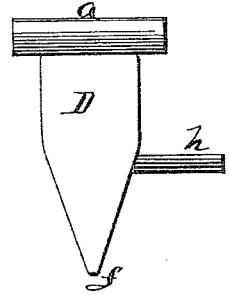
Figure 5:
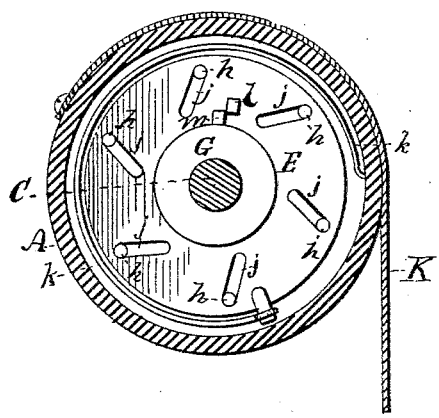
Figure 6:
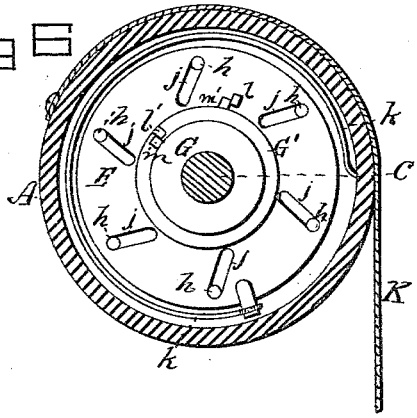
Figure 7:
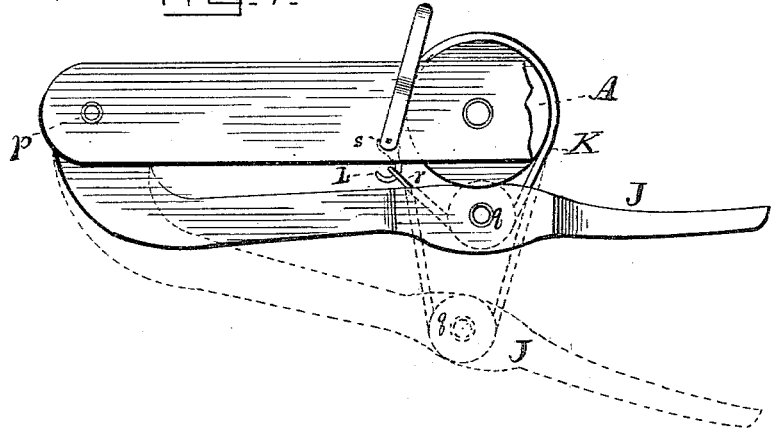
Figure 8:
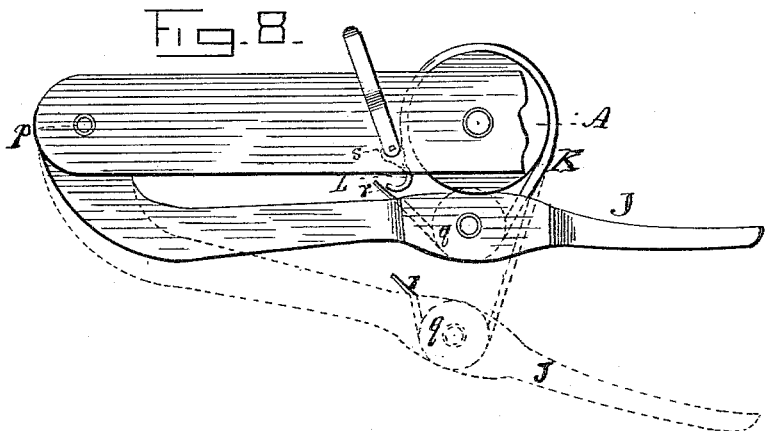
Figure 9:
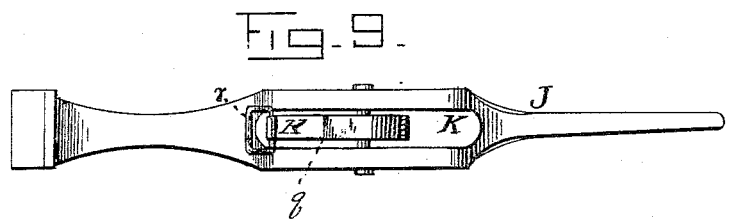

Figure 1 is an axial section of so much of a bicycle as necessary to show my invention applied thereto; Fig. 2, a central transverse section thereof through the improved clutch, pawls, and parts immediately connected therewith, the planes of the section being indicated by the line $x\ x$, Fig. 1; Fig. 3, a side view of one of the pawls; Fig. 4, an edge view of the same; Fig. 5, a transverse section in a plane indicated by the line $y\ y$, Fig. 1; Fig. 6, a transverse section in a plane indicated by the line $y\ y$, Fig. 1, but showing a modification of the construction shown by the view in Fig. 5; Fig. 7, a partial side view, showing my improved motor device for changing power and speed by the rider, arranged for greater speed and less power; Fig. 8, a corresponding view of the same arranged for greater power and less speed; Fig. 9, a top view of the treadle shown in Figs. 7 and 8.

Like letters designate corresponding parts in all of the figures.

My improved clutch-pawls are for the purpose of producing continuous revolving motion by the reciprocal movement of the driver for propelling a bicycle or other machines.

In the drawings, A represents the driver, and B the hub or disk of a bicycle-wheel to be revolved by the driver on a pivot or shaft, C. The driver A is shown in the form of a hollow cylinder at the periphery encircling the hub-wheel B, to be rotated thereby, the said driver having a reciprocating oscillating motion imparted to it by the means represented or other and known means.

In the inner periphery of the driver A a sufficient number of pawls, D D, are pivoted, six being shown in the drawings. The pawls are preferably provided with pivots $a\ a$, formed fixedly or solidly thereon, these pivots fit in bearing-holes $b\ b$ in the rim $c$, and are opposite the flange $d$ of the driver, as shown. Each pawl has an eccentric, convexly-curved, or rounded edge, $f$, as shown in Fig. 3, and it is preferably wedge-shaped, or it has a transverse form approximating thereto at the edge to fit in a V-shaped groove, $g$, or one of equivalent form in the periphery of the hub or disk B, as shown in Fig. 1. These eccentric, rounded, wedge-shaped, or equivalently-formed pawls, thus taking in between the sides of the V-shaped grooves, hold unfailingly, securely, and firmly therein, and as the wedge form is not too sharp for the purpose, the pawls free themselves in the groove with great certainty, ease, and without noise in the backward motion of the driver.

On one edge of each pawl is a pin, $h$, which projects outward through an oblique slot, $i$, in the driver-flange $d$, as shown in Fig. 5, and through a similar oblique slot, $j$, in a disk or plate, E, lying outside of the said driver-flange, concentric with and close to the rim, as shown in Fig. 6. The disk E is movable around the hub or collar of the driver A for a little distance independently of the driver-flange, and it is connected with the flange by a spring, $k$, which tends to turn the disk backward by the side of the driver-flange. The slots of the disk thus are caused to act on the pins $h\ h$ of the pawls and to move and hold them backward, and the obliquity of the slots is such as also to allow them to swing outward at the same time, so that all the pawls are lightly held in action in the pawl-groove by the spring-moved disk, while at the same time yielding to allow the pawls to be easily retracted. On this disk E, also, I place a stop or pin, $l$, Fig. 5, to strike a fixed stop, $m$, on a collar, G, on the pivot or shaft C. This limits the backward movement of the driver, but will allow an oscillating movement thereof through nearly a whole circle. This collar is adjustable in position on the pivot or shaft by the nut $n$ and intermediate parts, so that the backward movement of the driver may be ended at any point in the circle desired.

The above-described construction will allow a retracting movement of the driver A of not quite a complete circle. If more than a circle of movement of the driver is required, then an additional collar, G', is employed, acting between the driver or disk E and the fixed collar G, as shown by the modification in Fig. 6, or otherwise. Here the stop $l$ on the driver-disk first strikes a stop, $m'$, on the intermediate collar, G', thereby carrying this collar around with it until a stop, $l'$, on this collar strikes the fixed stop $m$ on the fixed collar. If still more movement is required for the driver, then one or more additional movable collars may be used, acting in a similar way. Outside of the disk E is the flanged holder H for a coiled spring, I, which acts on an arm or projection, $o$, of the driver for the purpose of automatically drawing back the driver after each forward movement.

It is to be understood that the pawl-engaging spring $k$ must be weaker than the main retracting-spring I, otherwise it would overcome its action. The disk E, by its oblique grooves $j\ j$, acts on the pawl-pins $h\ h$ to free the pawl from the groove as soon as the stop $l$ of the driver strikes the fixed stop $m$, and then turns the said plate a little forward to carry the said pins inward in the said slots $j\ j$, and then when the driver moves forward again the spring $k$ swings the disk E back again, thereby drawing the pins $h\ h$ outward in the oblique slots $j\ j$, and forces all pawls simultaneously into action.

In Figs. 7 and 8 I show my new device for operating the driver, whereby either a greater speed and less power or greater power and less speed may be effected at will, and the change instantly made by the rider without stopping or slacking his motion.

J represents a treadle pivoted at $p$ to the frame of the bicycle. This treadle has a friction-sheave, $q$, around which a band or strap, K, wound around the periphery of the driver A above, extends, as shown. The outer end of the strap K terminates in a ring or eye, $r$, which ordinarily rests on the treadle, as shown by full lines in Figs. 7 and 8, but cannot be pulled through the sheave apertures of the treadle, as shown in Fig. 9.

Pivoted at $s$ to the frame of the bicycle is a lever-hook, L, which, when it is in the position shown in Fig. 7, hooks into the ring or eye $r$ of the driver-strap K. In this position the end of the strap is held fast by the lever-hook, so that when the treadle is depressed, as indicated by the dotted lines in Fig. 7, a double portion of the strap is taken up, thereby causing a double movement of the driver and producing great speed, as when traveling on a smooth and level street or road; but when the lever-hook L is moved to the position shown by full lines in Fig. 8, it is uncoupled from the ring of the strap, so that when the treadle is depressed, as indicated by dotted lines in Fig. 8, the end of the strap descends with the treadle, and only a length of strap is taken up or drawn down equal to the extent of depression given to the treadle, or about half as much as in the arrangement shown in Fig. 8. This second arrangement is to be used in ascending hills, or where the road is rough or hard to ride over. The upper end of the lever-hood L projects upward, as shown, so that the rider can easily move it from one position to the other instantly without interfering with the motion of the bicycle.

It is to be understood that all the parts herein described for driving the bicycle are to be duplicated on the other side of the bicycle-wheel.

I claim as my invention—

1. The combination of a series of eccentric wedge-shaped pawls, D D, arranged around the periphery of a driver, A, and a disk or hub, B, having a groove, $g$, therein, in which the edges of the pawls take and hold, substantially as set forth.

2. The combination of the pawls D D, provided, respectively, with pins $h\ h$, the driver-flange $d$, provided with oblique slots $i\ i$, through which the pins project, a movable disk or plate, E, also provided with oblique slots $j\ j$, into which the said pawl-pins extend, and a retracting-spring, substantially as set forth.

3. The combination of the driver A, disk or plate E, provided with a stop or pin, $l$, and an adjustable fixed stop, $m$, substantially as set forth.

4. The combination of the reciprocating driver A, treadle J, strap K, provided with a ring or eye, $r$, and movable lever-hook L, whereby a greater speed and less power or greater power and less speed may be obtained, substantially as set forth.

In testimony whereof I affix my signature in presence of two witnesses.

ANDREW A. UGLAND.

Witnesses:
JOHN J. FLYNN,
HOWARD C. LEVIS.